(12) United States Patent
Forman et al.

(10) Patent No.: US 8,117,215 B2
(45) Date of Patent: Feb. 14, 2012

(54) DISTRIBUTING CONTENT INDICES

(75) Inventors: George H. Forman, Port Orchard, WA (US); Zhichen Xu, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/889,740

(22) Filed: Sep. 24, 2010

(65) Prior Publication Data

US 2011/0016128 A1  Jan. 20, 2011

Related U.S. Application Data

(62) Division of application No. 10/922,694, filed on Aug. 20, 2004, now Pat. No. 7,836,076.

(51) Int. Cl.
*G06F 7/00* (2006.01)
*G06F 17/30* (2006.01)

(52) U.S. Cl. .................. 707/750; 707/763; 707/770

(58) Field of Classification Search .................. 707/750, 707/763, 770
See application file for complete search history.

(56) References Cited

U.S. PATENT DOCUMENTS

| | | | |
|---|---|---|---|
| 5,675,788 A | 10/1997 | Husick | |
| 6,591,266 B1 * | 7/2003 | Li et al. ................................ | 1/1 |
| 6,735,583 B1 | 5/2004 | Bjarnestam | |
| 7,249,118 B2 * | 7/2007 | Sandler et al. ........................ | 1/1 |
| 7,428,529 B2 * | 9/2008 | Zeng et al. ............................ | 1/1 |
| 7,689,585 B2 * | 3/2010 | Zeng et al. ............. | 707/999.104 |
| 2002/0161757 A1 * | 10/2002 | Mock et al. ...................... | 707/5 |
| 2002/0198869 A1 * | 12/2002 | Barnett ........................... | 707/3 |
| 2003/0004932 A1 | 1/2003 | Chow | |
| 2006/0059119 A1 | 3/2006 | Canright | |
| 2007/0156677 A1 | 7/2007 | Szabo | |

OTHER PUBLICATIONS

Ng and Zhang, Predicting Internet Network Distance with Coordinates—Based Approaches, 2002 IEEE, 0-7803-7476-2/02.

* cited by examiner

*Primary Examiner* — Cam Truong

(57) ABSTRACT

A query-centric system and process for distributing reverse indices for a distributed content system. Relevance ranking techniques in organizing distributed system indices. Query-centric configuration subprocesses (1) analyze query data, partitioning terms for reverse index server(s) (RIS), (2) distribute each partitioned data set by generally localizing search terms for the RIS that have some query-centric correlation, and (3) generate and maintain a map for the partitioned reverse index system terms by mapping the terms for the reverse index to a plurality of different index server nodes. Indexing subprocess element builds distributed reverse indices from content host indices. Routines of the query execution use the map derived in the configuration to more efficiently return more relevant search results to the searcher.

15 Claims, 7 Drawing Sheets

DISTRIBUTING CONTENT INDICES

CROSS REFERENCE TO RELATED APPLICATIONS

This application is a divisional of U.S. Ser. No. 10/922,694, now U.S. Pat. No. 7,836,076, entitled "Distributing Content Indices," filed Aug. 20, 2004, which is hereby incorporated by reference

BACKGROUND

1. Technical Field

The disclosure relates generally to searching systems and processes for obtaining access to distributed content.

2. Description of Related Art

The increasing need to share computer resources and information, the decreasing cost of powerful workstations, the widespread use of networks, the maturity of software technologies, and other such factors, have increased the demand for more efficient information retrieval mechanisms.

In general, a common factor of searching system techniques is the use of simple keyword matching, but generally ignoring advanced relevance ranking algorithms. There is a need for improving network distributed content searches.

BRIEF SUMMARY

The invention generally provides for a query-centric approach using relevance ranking techniques in organizing distributed system indices.

The foregoing summary is not intended to be inclusive of all aspects, objects, advantages and features of the present invention nor should any limitation on the scope of the invention be implied therefrom nor should any be implied from the exemplary embodiments generically described herein. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

BRIEF DESCRIPTION OF THE DRAWINGS

FIGS. 3A and 3B illustrate details for the CONFIGURATION element of FIG. 2 in which FIG. 3A is a system and process flow diagram and FIG. 3B is a correlated flow chart.

FIGS. 4A and 4B illustrate details for the INDEXING element of FIG. 2 in which FIG. 4A is a system and process flow diagram and FIG. 4B is a correlated flow chart.

FIGS. 5A and 5B illustrate details for the QUERY EXECUTION element of FIG. 2 in which FIG. 5A is a system and process flow diagram and FIG. 5B is a correlated flow chart.

Like reference designations represent like features throughout the drawings. The drawings in this specification should be understood as not being drawn to scale unless specifically annotated as such.

DETAILED DESCRIPTION

Figure 1:
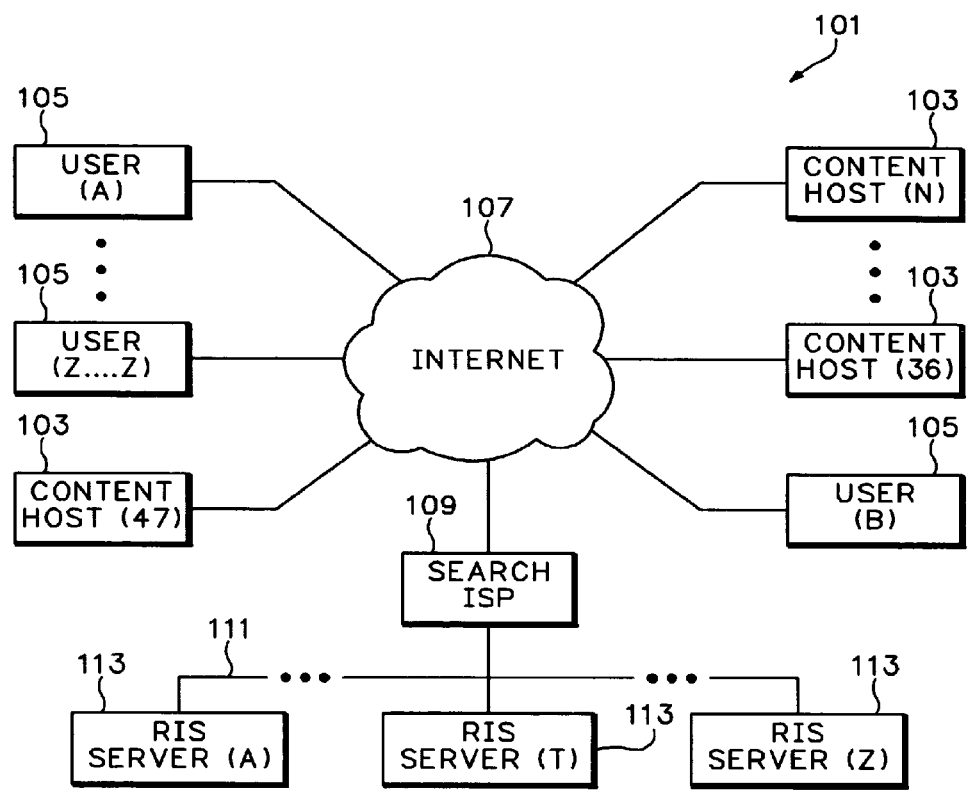
FIG. 1 is a schematic diagram of an exemplary distributed system using the Internet and incorporating apparatus and processes in accordance with an exemplary embodiments of the present invention.

FIG. 1 illustrates a typical distributed system 101 of nodes—also referred to in the art as computers, servers, document servers, hosts, and the like. The illustration of FIG. 1 is simplified for the benefit of explanation of the present invention. It will be recognized by those skilled in the art that a more complex reality is implied as each nodal machine represented in labeled-box format, whether a personal computer, mainframe computer, personal digital assistant, web-ready telecommunications device, and the like, may serve multiple functions. Other networking formats, proprietary intranets, peer-to-peer networks, and the like, may also derive implementations of the present invention.

Some of the network nodes 103, shown as representative boxes labeled "CONTENT HOST 36," "CONTENT HOST 47," and "CONTENT HOST N" may include one or more forms of stored content—e.g., published documents, graphics, entertainment media, and the like. Other network nodes 105, "USERS 105A, 105B . . . 105Z . . . Z,"—e.g., personal computers, servers, personal digital assistant devices, web-enabled telecommunication devices, or the like, having browser programs, e.g., Microsoft Explorer™, Netscape™, and the like—seek to gain relatively rapid access to stored content via the Internet 107. Various well known search engines—e.g., Google™, AskJeeves™, Gnutella™ and the like, shown as "SEARCH ISP" (Internet Service Provider) 109 (illustrating one of the many)—facilitate the USERS 105 searching the Internet for stored content based on user-generated queries.

One form of search engine is known a the "reverse index system" (RIS). Basically, whenever content is newly posted by an owner, generally at their own web site to be available over the Internet 107, such RIS programs may peruse such content and tokenize it. The content may be broken into a set of "tokens," other elements; e.g., words-of-interest that might be relevant to a later search for the content as a whole. This may be considered as analogous to an index of a book, A RIS file, or a like database, is created for each token. Each RIS file may thus accumulate many web sites having stored content having the same token term(s). A directory of RIS files may be stored at each SEARCH ISP 109. Thus, search terms of a user query may be compared to the directory which leads to a particular RIS the which in turn may point—e.g., by path identifier(s) and CONTENT HOST's address/file identifier(s)—to the plurality of HOST locations of full, stored content. For example, assume the current query sent by a USER 105 is the proper name "Louis Armstrong," The return to the USER of CONTENT HOST addresses—also referred to as "hits"—generally will include every match for the word "Louis," every match for the word "Armstrong, and every match for the compound term "Louis Armstrong," perhaps putting at the head of the returns, those which actually have the compound term "Louis Armstrong" and at the end of the returns those for hits such as "St. Louis, Mo." or "Armstrong Baking Powder." USERS 105 can usually narrow searches by refining search terms of the query to narrow the number of resultant matches, e.g., a query for "trumpet Armstrong" may likely return far fewer irrelevant hits. But this manner of improving the quality of arch returns relies on the USERS intuitive ability to formulate proper searches.

Assuming the USER 105 query is now for "trumpet Armstrong." Also, assume that a SEARCH ISP 109 has alphabetized its RIS servers. The SEARCH ISP 109 may run appropriate subprocesses via its network 111 of RIS SERVERS 113 (recognizing that this is a simplification in that index servers may also be distributed around the system), searching for the index file for the token "trumpet"—e.g., FIG. 1, "RIS SERVER (T)—and the index file for the token "Armstrong"—e.g., FIG. 1, RIS SERVER (A). The SEARCH ISP 109 may then co-relate the findings to return to the querying USER 105 a list that may constitute higher probability hits of web sites links to HOST(S) 103 having stored content for famous jazz trumpeter Louis Armstrong. Generally, however, the SEARCH ISP 109 still returns lower order separate hits for "trumpet" and "Armstrong."

However, in order to improve efficiency and to prevent gridlock over the network from the multitude of search requests continuously received, operations such as Google company distribute processes over many SEARCH ISP engines and the RIS files over many servers. For example, assume there is a first server having all RIS files for the "a words" (e.g., "aardvark" through "azure," including "Armstrong") RIS files, and a twentieth server having the RIS files for the "t words" ("tab" through "tzar," including "trumpet). Such ISPs may use known manner distribution hash function techniques to point to servers having the reverse index files relevant to each current particular search. Distributed hash tables effectively multiplex the plurality of RIS servers for storage and retrieval of the relevant reverse index table for each query identifier term. Thus, a hash function on "trumpet" and a hash function on "Armstrong" returns the first and twentieth servers as the ones having the relevant reverse index lists. Generally, an intermediating server will perform a Boolean operation to correlate all the RIS lists found and return mostly those files which relate to trumpeter Louis Armstrong, cancelling hits on others with a less likely probability of being a true hit; e.g. eliminating web site links to "trumpeting elephants" or "Armstrong tires."

A problem may occur, for example, if the query string is large or uses a plurality of very common terms—e.g., a specific query phrased as "trumpeter Louis Armstrong playing the song Do You. Know What It Means To Miss New Orleans at Carnegie Hall." Now many RIS. SERVERS 113 will need to be accessed in order to accumulate the vast number of CONTENT HOST 103 links that may satisfy the hashing of all these terms. Much more computer time, network traffic, and processing power is consumed.

The invention generally provides for a query-centric approach in organizing stored content indices. It has been determined that this query-centric approach may greatly reduce the amount of metadata and unnecessary metadata replications. The query-centric approach may be tailored to find more relevant responses to queries in a more efficient manner.

Several assumptions, or givens, are employed in accordance with describing exemplary embodiment present invention. The system 101 shown if FIG. 1 is used to provide the basic structure of a distributed networking system. A known manner log file listing queries users have made or are likely to make may be used by SEARCH ISPs 109. A set of index servers, RIS SERVERS 113, is operated in a known manner. While a distributed system exemplary embodiment is described in detail with respect to the ubiquitous Internet 107 system, it will be recognized by those skilled in the art that other network systems—e.g., a proprietary intranets, peer-to-peer networking, and the like—can adapt the present invention to specific implementations therefor.

Figure 2:
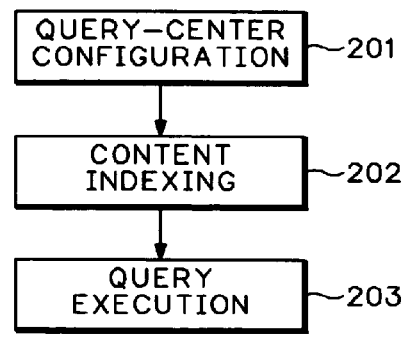
FIG. 2 is a generic block diagram for the system and methodology of an exemplary embodiment the present invention.

FIG. 2 is a general overall process flowchart for an exemplary embodiment of the present invention. It will be recognized by those skilled in the art that the process can be implemented in machine-language, such as software, firmware, or other computer code and the like, stored in a computer-readable medium such as memory in the nodes of the distributed system 101. The process may be segregated into three major components: QUERY-CENTRIC CONFIGURATION 201 (referred to more simply hereinafter as just CONFIGURATION 201), CONTENT INDEXING 202, and QUERY EXECUTION 203. The routines of the CONFIGURATION 201 element (1) analyze query log files to form a construct, such as a term co-occurrence graph, (2) partition such a graph, generally localizing search terms for each RIS SERVER 113 to have some query-centric correlation, and (3) generate and maintain a map for the partitioned query-term data sets by mapping each query-centric term, usually to a single index server node RIS SERVERs 113. The routines of the CONTENT INDEXING 202 element build distributed query-centric reverse indices from CONTENT HOST indices using the map distribute them to RIS SERVERs 113. The routines of the QUERY EXECUTION 203 then use the map derived in the CONFIGURATION 201 to more efficiently return more relevant search results to the querying USER 105.

For purpose of description, assume that the process is implemented by an ISP such as SEARCH ISP 109, FIG. 1 with respect to its network 111 of RIS SERVERS 113. It should be recognized that a variety of specific implementations are envisioned by the inventors, including selling a software product useful to ISPs, providing the processes ISPs to develop specific implementations, doing business by offering the processes on individually retained Internet node machines, and the like.

Figure 3A:
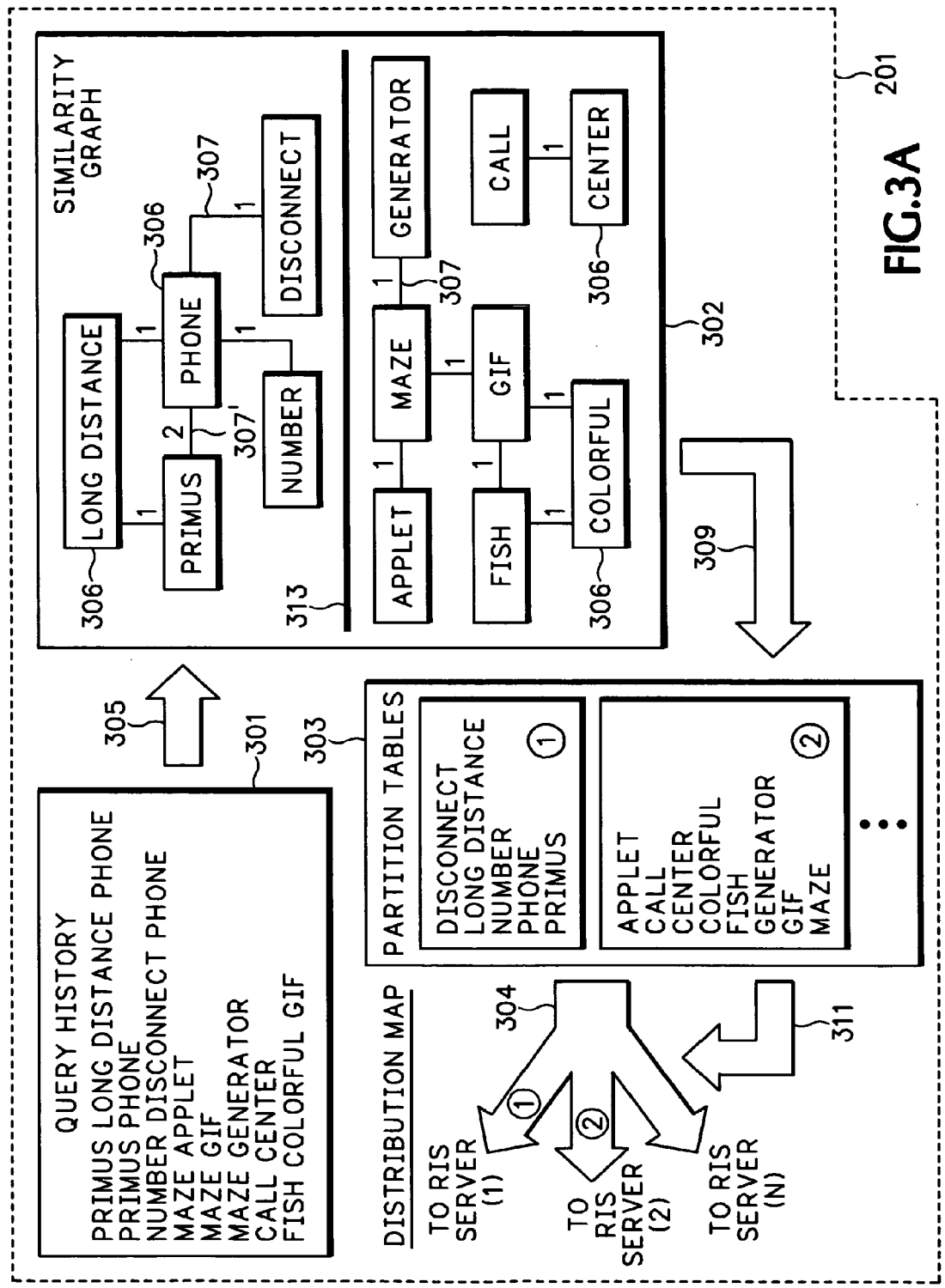
Figure 3B:
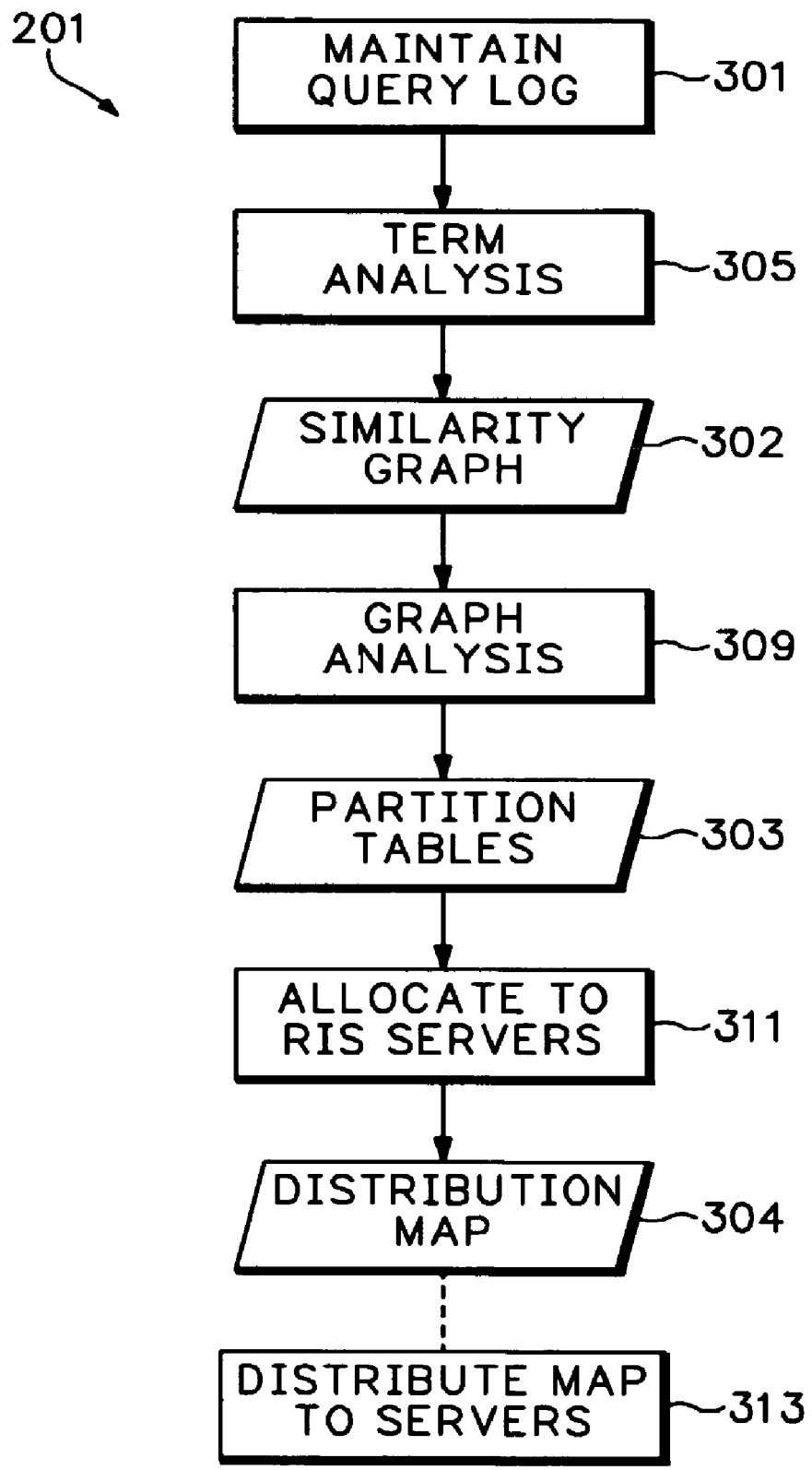

FIGS. 3A and 3B are an exemplary embodiment of the subprocess for CONFIGURATION 201 of FIG. 2. The goal of the CONFIGURATION 201 subprocess is to partition the query terms using query-centric analysis and to generate a map, mapping partitioned query terms onto a plurality of RIS SERVERS 113 accordingly. A log, e.g., "QUERY HISTORY" file, 301 may be created in a known manner to develop and to maintain a history of USER 105 queries. In general, the log 301 may be a listing, of all specific queries from all users, or a statistically relevant representative sample thereof such as terms created or added by a system analyst or another program, whereby each user is attempting to find specific content which may be at one or more specific CONTENT HOSTs 103 via the Internet 107.

A statistical-type analysis 305 is made of the log periodically; for example, a count may be maintained of the frequency of co-occurrence for every pair of co-occurring terms in the queries. The analysis 305 results in a data form 302 correlating search terms. In this exemplary embodiment, the analysis 305 is used specifically to create a SIMILARITY GRAPH 302. For example, in the current QUERY HISTORY 301, the term "PHONE" is separately coupled with

"PRIMUS LONG DISTANCE,"

"PRIMUS" and

"NUMBER DISCONNECT."

The words "LONG" and "DISTANCE" being of a relatively common coupling in standard usage with respect to telephony, may be made one query term (e.g., "long_distance") for analysis purposes. In other words, it should be recognized that the size of the graph can be reduced by using known manner techniques such as coalescing common term pairs, stemming, truncating terms, universal characterizing, and the like. Each word of a query, or compound term if a logical correlation of words is recognized, is considered a node 306 of the SIMILARITY GRAPH 302 and each nodal connector, or "edge" 307, indicates a direct relationship of the nodes connected thereby. Any word or compound term that appears multiple times, becomes a single node 307; e.g., there is only one "PHONE" node even though it appears in multiple query terms. Each edge may be assigned a value connotative of the frequency of co-occurrence, creating a relevance ranking. In this example, the terms "PRIMUS" and "PHONE" are paired twice in the QUERY HISTORY, therefore their nodal connector edge 307' is assigned a value of "2," In other words, each of the edges 307, 307' may have an assigned frequency weight reflecting how often the terms co-occur in the QUERY HISTORY 301.

Next, GRAPH ANALYSIS 309 is performed. In the preferred embodiment, a graph partitioning method may be employed, partitioning the SIMILARITY GRAPH 302 into PARTITION TABLES 303 such that the number of tables or alternatively, lists or other commonly used stored data formats created minimizes the total frequency weight cut across partition boundaries. In other words, ideally, no edges would remain that connect PARTITION TABLE 1 to any other derived PARTITION TABLE, Hardware constraints or limitations may define the partitioning limits e.g., having only a given set of available index servers, some servers having limited memory available for index storage, or the like, where the memory is an example of a computer-readable storage medium.

As an option, in addition to the frequency count, or weight, on the edges 307, each node 306 may be supplemented with a count, or weight, to refine the system, e.g., being an indication of how long the index, file may be or how often it is used.

It will be recognized by those skilled in the art that the present invention may be implemented using a variety of known manner statistical analysis partitioning methods to correlate search query terms. Two known manner examples which may be employed in accordance with the present invention are described next.

As one example, The Algorithm Design Manual, by Steven S. Skiena, copyright 1997, by TELOS publishing, ISBN: 0367948600, explains: "The basic approach to dealing with graph partitioning or max-cut problems is to construct an initial partition of the vertices (either randomly or according to some problem-specific strategy) and then sweep through the vertices, deciding whether the size of the cut would increase or decrease if we moved this vertex over to the other side. The decision to move v can be made in time proportional to its degree by simply counting whether more of v's neighbors are on the same team as v or not. Of course, the desirable side for v will change if many of its neighbors jump, so multiple passes are likely to be needed before the process converges on a local optimum. Even such a local optimum can be arbitrarily far away from the global max-cut."

As a second example of a partitioning process, where the SIMILARITY GRAPH provides a relatively large number of disconnected terms, a "union-find" algorithm may be employed. Basically, such a process will sort the edges, most frequent first, and run them through the "union-find algorithm" one-by-one, but ignoring the lowest frequency pairs. Next, for each edge, the process will connect its two endpoints into one connected component, unless they are already in the same component or unless doing so would cause the joined component to be larger than the size constraint for a single index server. At the end, there may be very many disjoint components. Next, the process will apply a well-known bin-packing algorithm (likely the known manner "greedy" method) to pack the components of different sizes into 'bins' which are related to the workload capacity of each index server.

It can now be recognized that the partitioning algorithm for a specific implementation may be run on one or more separate computers. In providing a business, service, for example, a single computer may analyze one or more query logs around the distributed system (see FIG. 1) and run the partitioning algorithm and other processes for a business client.

Returning now to the CONFIGURATION 201 process, the PARTITION TABLES $303_{1, 2, \ldots, n}$ be distributed 311 to RIS SERVERS 113. Generally, the more common the search term, the longer the reverse index file listing of CONTENT HOST web site links therein will be. Included in the distribution subprocess 311 is the creation of a DISTRIBUTION MAP 304.

The DISTRIBUTION MAP 304 may be developed at and may reside at the SEARCH ISP 109. Again, among practitioners, a variety of such mapping techniques are known and may be adapted to a specific implementation of the present invention. For example, another way both to partition the graph and then to map a term to an RIS SERVER 113 is network proximity estimation, using a landmark-based approach. With this approach, a small number of terms in the similarity graph may be selected as landmark nodes. Every non-landmark term in the graph measures their distances (minimum) to these selected landmark terms in the graph, and a coordinate is computed based on this measurement. A reference to how this can be done can be found in Predicting Internet Network Distance with Coordinates-based Approaches, T. S. E. Ng and H Zhang, Proceedings of the IEEE International Conference on Computer Communications (INFOCOM 2002), June 2002, incorporated herein by reference.

Thus, each PARTITION TABLE $303_{1, 2, \ldots, n}$, may be assigned to a different one of the RIS SERVERS 113 (FIG. 1) as a file for CONTENT HOST 103 web site links. As will be recalled from the Background Section hereinabove, in the prior art, a simple system of alphabetization had been employed for storing index server files. Now however, since the goal is to partition terms of the reverse index using a statistical analysis to create such correlated queries into relevance-related sets—such as the PARTITION TABLES $303_{1,2}$ of FIG. 3A where a frequency of co-occurrence for every pair of co-occurring terms in the queries was used the DISTRIBUTION MAP 304 may be created to track the assignment of each of the TABLES to their assigned RIS SERVERS 113. Note that the DISTRIBUTION MAP 304 may be saved as file on a shared file system and all those connected to the network can begin using it, whether the network is fundamentally static as with ISP RIS SERVERS 113 servicing HOSTS 103 over the Internet 107, or more dynamic situations such as in peer-to-peer networking.

When partitioning a SIMILARITY GRAPH 302 and mapping PARTITION TABLES 311 in practice, in addition to considering the popularity of the terms in queries, the popularity of the terms in the entire corpora of content items and the selectivity of the query terms also may be considered. Below a few exemplary relevant principles that the inventors have identified:

1. Popular terms that appear in queries should be mapped to a larger number of nodes via replication. This helps to better distribute the query load.

2. To balance the query load on the nodes, it may be beneficial to collocate popular terms with unpopular ones.

3. If a term is popular in the corpora, it implies that more documents will have the term, and more storage space is needed to store the index list.

4. Terms that are popular in a corpora usually have smaller selectivity, it is usually proper to distribute such terms across a relatively large number of nodes.

5. New graphs are usually constructed periodically because the nature of queries received by the system can change over the time. When assigning a term to a node, minimize the changes to the previous mapping to minimize the data movement.

Principles and other considerations as these and others as may be relevant to a particular implementation of the invention can be incorporated in the graph partitioning algorithms; e.g., by assigning a weight to each term and controlling the overall weight of terms to be stored on a particular node.

No matter how well the SIMILARITY GRAPH 302 is partitioned, there may always cases where terms in the same query are mapped to different RIS SERVERS 113. That is, one or more edges 307 may cross the boundary 313. To reduce the inefficiency due to this; it may be advantageous to organize the hosts into an overlay network according to network proximity, and store terms that are close to each other on the SIMILARITY GRAPH 302 onto nodes that are close to each other in terms of network distances to improve network performance. One way to achieve this goal is to assign node identification (ID) to each PARTITION TABLE 303(1), 303(2) . . . 303($n$) according to relative network positions; nodes close to each other in network distances are assigned similar IDs in the overlay ID space. Similarly, terms that are close to each other in the SIMILARITY GRAPH 302 are mapped to nodes with IDs close in the ID space. In other words, based on a similar analysis, and edge between partitions can be weighted such that the distribution of indices takes into account that interrelationship. A separate Similarity Graph may be constructed to design the layout of distributed Reverse Index Servers accordingly. Furthermore, for terms that are popular in the content corpora, there are cases when multiple nodes are needed to store the index list of the corresponding documents. The partition distribution 311 and mapping 304 may be arranged in such a way that nodes hosting the same term are close to each other in the network of interest.

Note also that the SIMILARITY GRAPHs 302 may be constructed in parallel. Each ISP node of the system 101 constructs a partial graph based on the queries it witnessed, and a reduction network may be constructed to merge them. This may be particularly valuable for P2P networking. When the overlay is constructed to take advantage of network proximity, the reduction can be performed more efficiently.

Figure 4A:
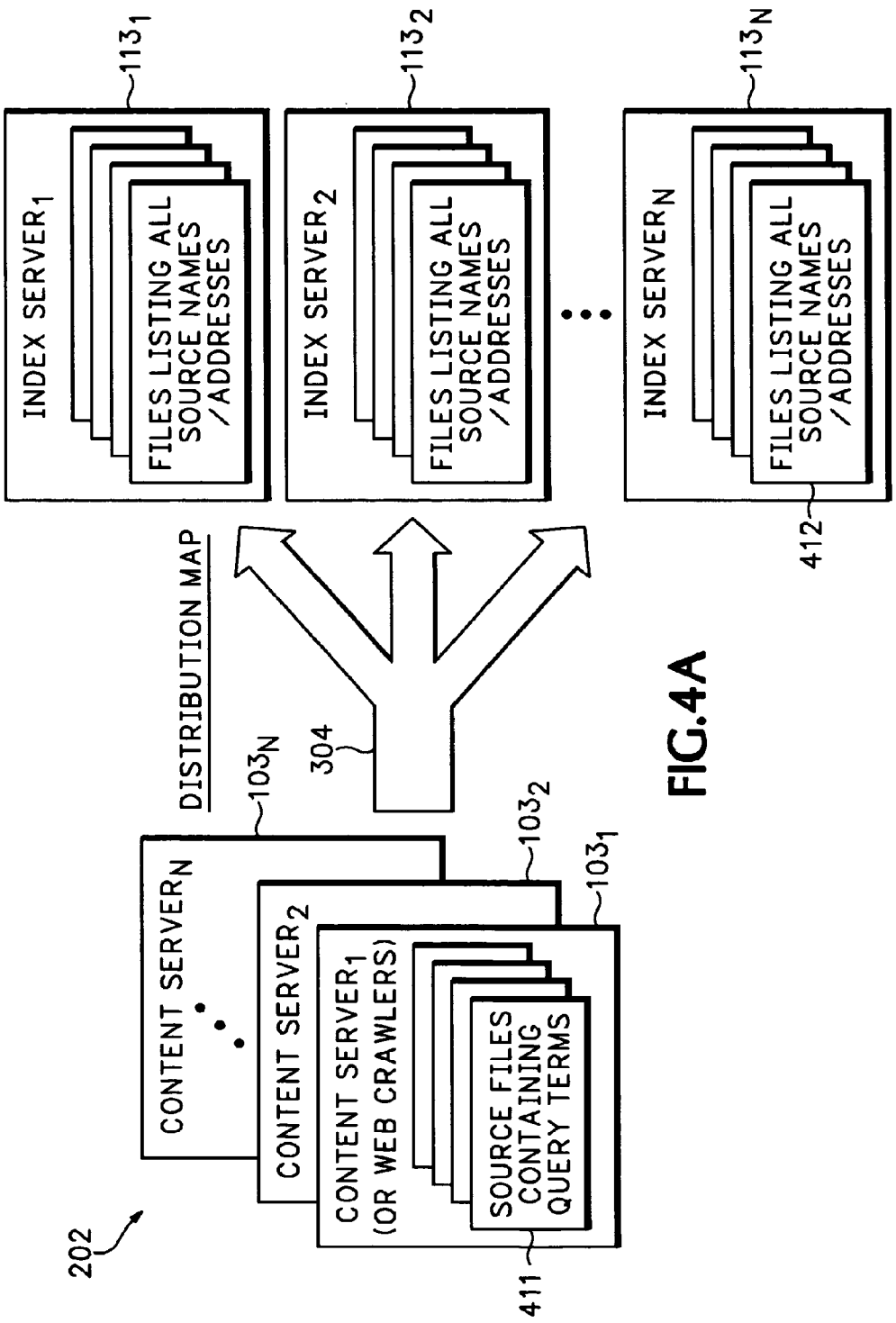
Figure 4B:
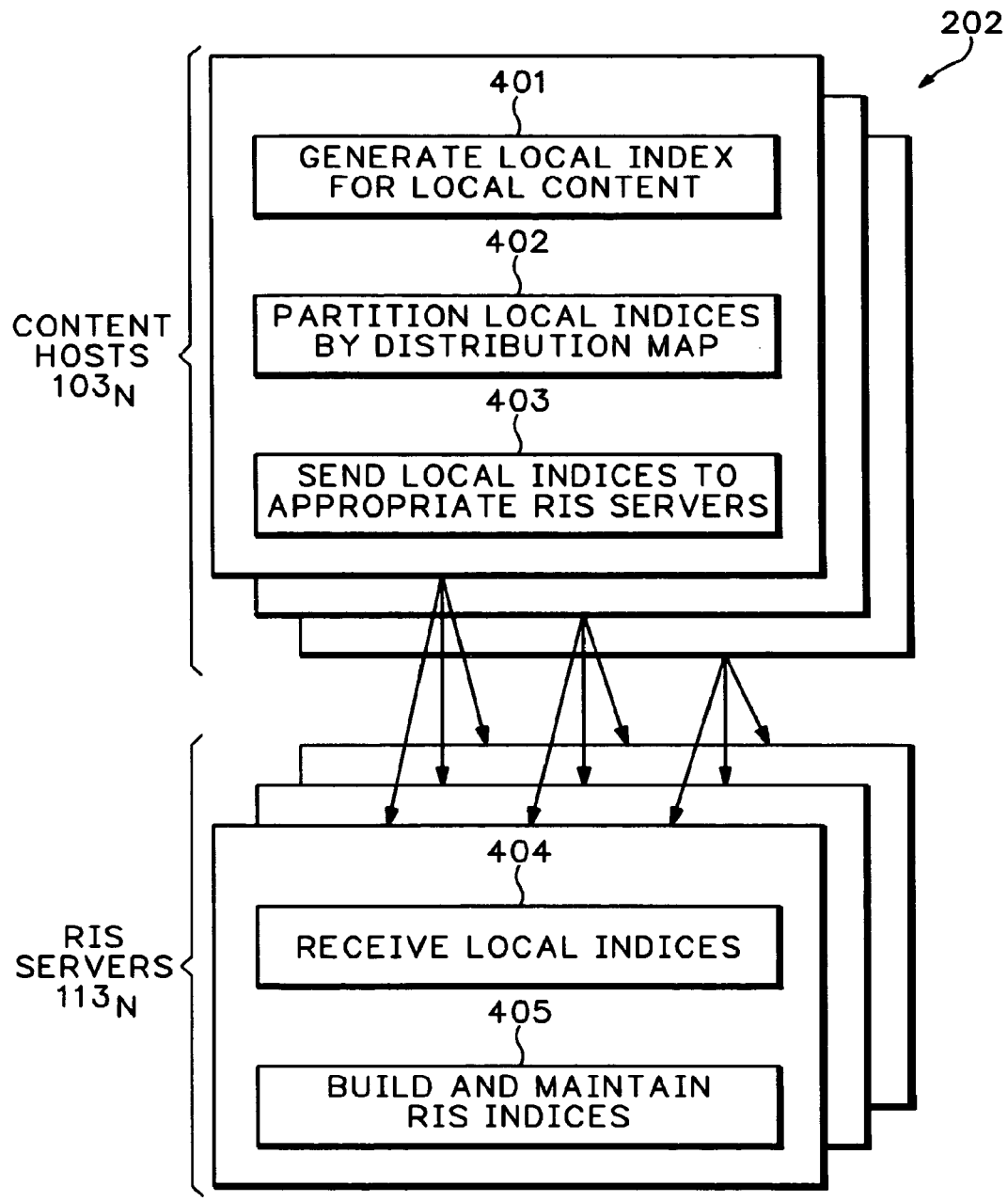

Thus, having now described the CONFIGURATION 201 system and process, it can be recognized that there is now a query-centric partitioning of search-query terms for a reverse index system and distributing of the partitions, with a mapping of indexed query terms to a plurality of RIS server network nodes operating in conjunction with a set of content network nodes and a set of user network nodes. Again, those skilled in the art will recognized that each system 101 node is a machine that may serve one or more functions. Another distinct advantage can be recognized in that it is now likely that related content links will be in close network proximity, particularly important in improving the performance of a system where index servers themselves are widely distributed also. FIGS. 4A and 4B illustrate details for the CONTENT INDEXING element of FIG. 2 in which FIG. 4A is a system and process flow diagram and FIG. 4B is a correlated flow chart. For purpose of facilitating description of the invention, assume there will be a given set of index servers—e.g., FIG. 1, RIS SERVERs 113—that are to hold the reverse index lists in files created by the CONFIGURATION 201 process and a given set of content servers—e.g., FIG. 1, CONTENT HOSTs 103.

On each CONTENT HOST $103_{1, 2, \ldots n}$, independently and in parallel:

(401) generate a reverse index for each query term over all the content source files 411 hosted at that CONTENT HOST;

(402) compare the reverse index generated 401 to the terms of each DISTRIBUTION MAP 304 obtained from each SEARCH ISP 109; and (403) send the reverse indices for all terms that appropriately map to the appropriate SEARCH ISP(s). Thus, the reverse indices distributed across the network by each CONTENT HOST 103 are parsed out only to appropriate SEARCH ISPs 109 according to each one's DISTRIBUTION MAP 304 rather than to all SEARCH ISPs.

On each RIS SERVER $113_{1, 2, \ldots n}$, independently and in parallel: for each query term, build its reverse index query-term partitioned files 412 by merging the reverse indices received from all CONTENT HOSTs 103. Thus, at each RIS SERVER $113_{1, 2, \ldots n}$ for each query term, there is a reverse index file 412 which may list CONTENT HOST source file names, or other identifiers, and a linking address to the full content containing the query-term. Since each of the CONTENT HOSTs 103 sort each of their reverse indices, naturally, this may amount to the merge step of merge-sort, and is O(N) rather than O(N log N) for sorting.

In other words, on the system 101 node were the partitioned query terms is mapped to, and in the file for the appropriate partitioned query term, the subprocess stores the content link list, or reference to another such a list.

Figure 5A:
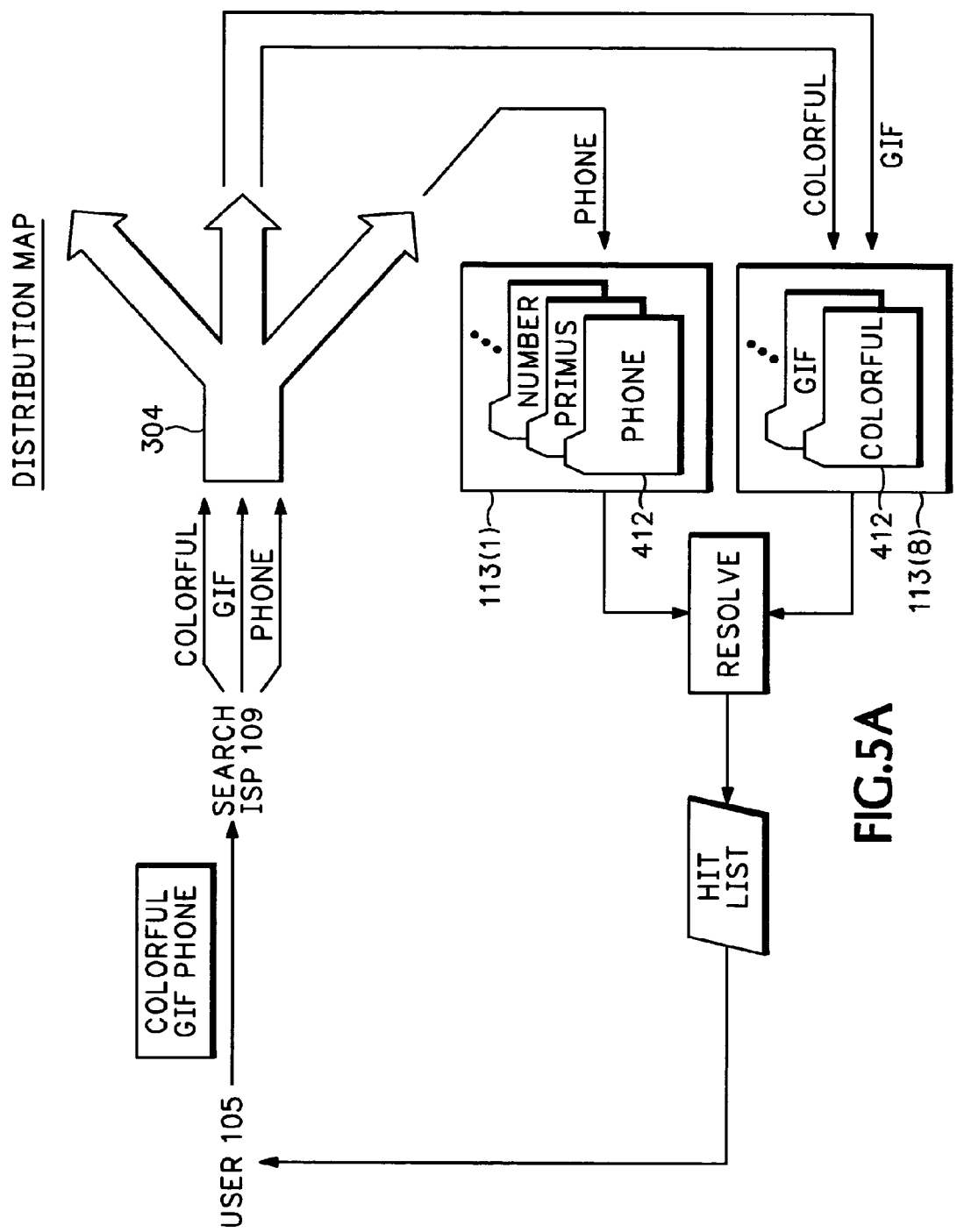
Figure 5B:
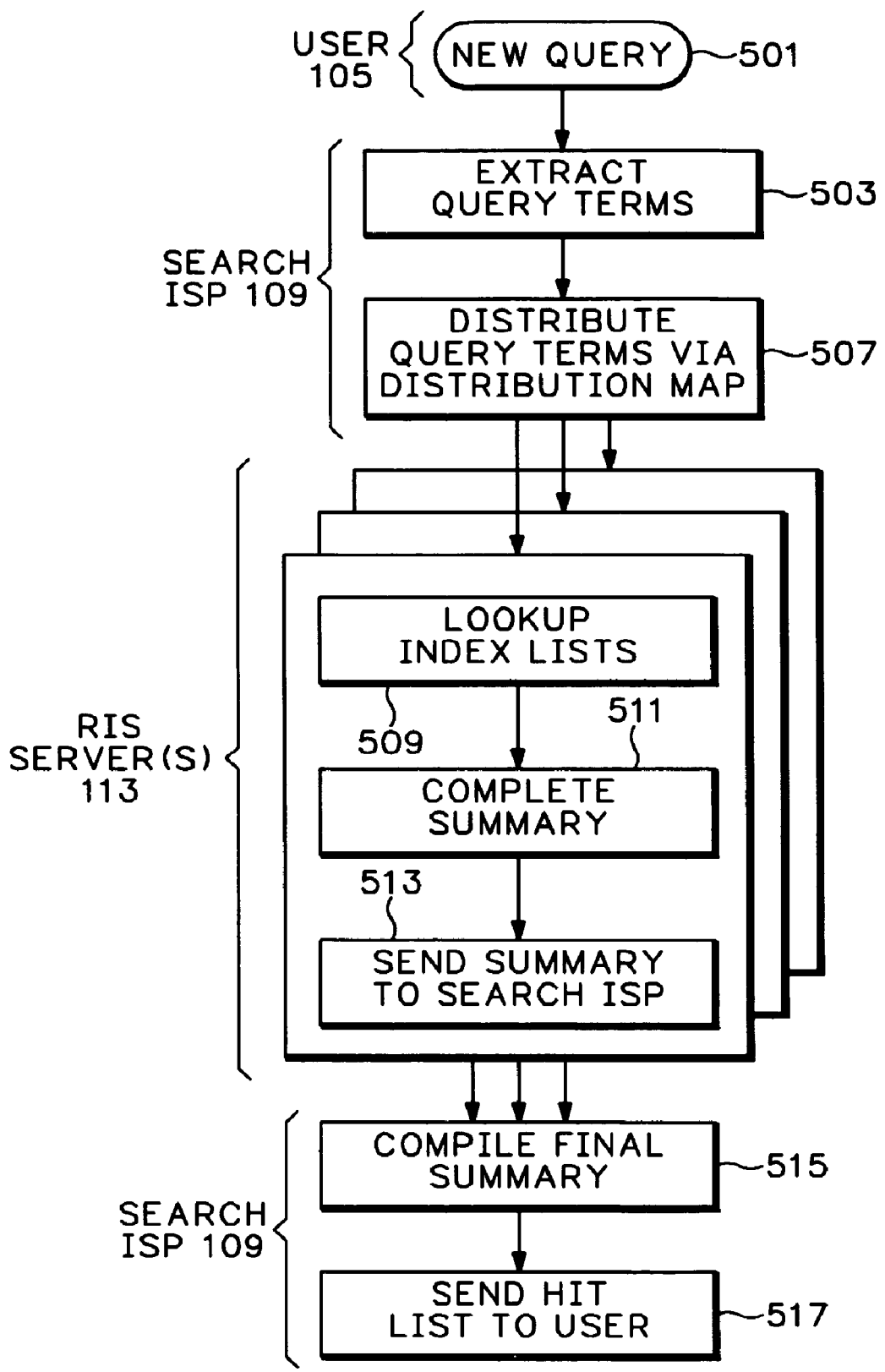

It can be recognized now that the system in this exemplary embodiment may be set up such that there is a distribution to RIS SERVERS $113_{1, 2, \ldots n}$ reverse index list files 412 wherein each file likely may have query terms that have a high probability of having some similarity, as determined by the SIMILARITY GRAPH 302, rather than a mere arbitrary relationship, e.g., "the term starts with the letter 'a'." Now, using the DISTRIBUTION MAP 304, new queries can be more efficiently handled. In other words, whereas in a prior art flooding scheme, such a Google search, a new query may go to all index servers connected therethrough, in accordance with the present invention a new query will be handled more intelligently rather than in a one-to-all communication which would use up network resources needlessly. FIGS. 5A and 5B illustrate details for the QUERY EXECUTION element of FIG. 2 in which FIG. 5A is a system and process flow diagram and FIG. 5B is a correlated flow chart.

A new query, composed of a set of terms residing on a USER node 105 or a query server, is generated 501, e.g., "colorful GIF phone." Each term of the new query is mapped via the DISTRIBUTION MAP 304. First, each term of the new query is mapped 502 through the partitioning to determine which of the RIS SERVERs 113 contains the reverse index list including that term. For example, looking back to FIG. 3A, terms were partitioned into the PARTITION TABLES 303 such that the terms "colorful" and "GIF" went into PARTITION TABLE 2 and "phone" went into PARTITION TABLE 1. Thus, the new query is only parsed out 503 to two RIS SERVERS 113 having the relevant files of lists of CONTENT HOSTs 103 as illustrated by the labeled arrows from the DISTRIBUTION MAP 304. However, it may be predicted and it has been found experimentally that because of the way the partitioning was constructed, on average, all query terms may be likely sent to only a single RIS SERVER 113.

In the event of forwarding the new query to each of multiple relevant RIS SERVERS 113 for matching and retrieval of appropriate links in the list therein, it may be preferable to designate one of them as a "leader." For example, an acceptable method may be to select as the leader as an RIS SERVER 113 having the most number of the currently received query terms, in this same example, RIS SERVER 113(8) would be the leader having matches for both the terms "colorful" and "GIF." This information can be used in the next steps.

Each RIS SERVER 113 performs a lookup 504 on the terms it owns; for example, using the forwarding lists for the contents, resolving multiple terms received. e.g., the RIS SERVER 113(8) correlating the terms "colorful" and "GIF" to return hits having only both terms. Note that this will be a much shorter list of terms than an exemplary alphabetize index server in the prior art, as such would return would have returned all of the hits for "colorful" from its "C file" and all the file for "GIF" from its "G" file. Thus, an RIS SERVER 113 computes an individual summary 505; if more than one RIS SERVER is involved, the summary is sent to the leader. As another example: suppose the query is: "(a and b and c) or (f and g and h) or . . . ", and suppose only the boldface terms reside on the local index server. An RIS SERVER 113 could compute the list of documents matching only the sub-expressions "(a and b and c)" and "(g and h)", reducing the number of lists and moreover the total volume of data that needs be sent to the leader; or if it is the leader, then reducing the amount of computation that needs be performed after the results from the other index servers arrive, reducing the query latency for the user.

The RIS SERVER 113 involved if only one, or the leader if more than one, provides the partially resolved term correlation lists to the SEARCH ISP 109. The SEARCH ISP 109 then compiles a final summary, namely, resolving to a final hit list for the querying USER 105—to continue the example, analyzing the shortened "colorful GIF" listing from the one RIS SERVER 113 having the PARTITION TABLE 2 files of related CONTENT HOST 103 web site links with the returned "phone" listing from the other RIS SERVER 113 having the PARTITION TABLE 2 files of related CONTENT HOST 103 web site links. In other words, the SEARCH ISP 109 creates a final hit list of all CONTENT HOST(s) 103 which have contents, i.e., complete documents or the like that match the entire new query. The hit list is then sent 507 back to the querying USER 105.

Thus, the present invention provides a combination of QUERY-CENTRIC CONFIGURATION 201, CONTENT INDEXING 202 and QUERY EXECUTION 203 in accordance with statistical analysis such as advanced relevance ranking algorithms such that a query-centric approach in organizing indices improves content searching tasks.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A method comprising:
   partitioning, by a reverse index system having one or more computers, search query terms to form partitioned sets of the search query terms, wherein the partitioning comprises partitioning the search query terms into the partitioned sets based on co-occurrence of given ones of the search query terms in a particular query, wherein co-occurrence of the given ones of the search query terms in the particular query comprises the given search query terms co-occurring in the particular query;
   distributing the partitioned sets of the search query terms to a plurality of index servers of said reverse index system, wherein the distributing includes generating a distribution map that maps the partitioned sets of the search query terms to corresponding ones of the plurality of index servers;
   using said distribution map to index links to content nodes to said partitioned sets of the search query terms; and
   using said distribution map for processing queries received from browser nodes.

2. The method of claim 1, wherein said content nodes store content to be accessed by the queries, and wherein indexing the links to said content nodes comprises indexing location identifiers to content in said content nodes.

3. The method of claim 2, wherein the location identifiers comprise website links.

4. The method of claim 1, wherein partitioning the search query terms comprises partitioning the search query terms in a log of queries.

5. The method of claim 1, further comprising:
   representing the search query terms as nodes within a construct, with edges connecting the nodes, wherein each edge of the edges is assigned a frequency weight for representing co-occurrence in a corresponding query of the search query terms represented by the nodes connected by a corresponding edge;
   wherein the partitioning is based on processing the construct.

6. The method of claim 5, wherein the construct is a graph.

7. The method of claim 1, further comprising:
   at each of the index servers, merging reverse indices received from said content nodes to form a reverse index file that associates search query terms with the links to said content nodes.

8. The method of claim 1, wherein using said distribution map for processing the queries comprises:
   mapping each of terms in a received given query using the distribution map to identify which of the index servers contains reverse index information for each corresponding term of the given query; and
   forwarding the given query to the identified index servers to retrieve links to said content nodes to obtain a result for the given query.

9. A non-transitory computer-readable storage medium storing computer code that upon execution causes a reverse index system having one or more processors to partition search query terms to form partitioned sets of the search query terms, wherein the partitioning comprises partitioning the search query terms into the partitioned sets based on co-occurrence of given ones of the search query terms in a particular query, wherein co-occurrence of the given ones of the search query terms in the particular query comprises the given search query terms co-occurring in the particular query;

distribute the partitioned sets of the search query terms to a plurality of index servers of said reverse index system, wherein the distributing includes generating a distribution map that maps the partitioned sets of the search query terms to corresponding ones of the plurality of index servers;

use said distribution map to index links to content nodes to said partitioned sets of the search query terms; and use said distribution map for processing queries received from browser nodes.

10. The computer-readable storage medium of claim 9, wherein said content nodes store content to be accessed by the queries, and wherein indexing the links to said content nodes comprises indexing location identifiers to content in said content nodes.

11. The computer-readable storage medium of claim 10, wherein the location identifiers comprise website links.

12. The computer-readable storage medium of claim 9, wherein partitioning the search query terms comprises partitioning the search query terms in a log of queries.

13. The computer-readable storage medium of claim 9, wherein the computer code upon execution cause the system to further:

represent the search query terms as nodes within a construct, with edges connecting the nodes, wherein each edge of the edges is assigned a frequency weight for representing co-occurrence in a corresponding query of the search query terms represented by the nodes connected by a corresponding edge;

wherein the partitioning is based on processing the construct.

14. The computer-readable storage medium of claim 13, wherein the construct is a graph.

15. The computer-readable storage medium of claim 9, wherein using said distribution map for processing the queries comprises:

mapping each of terms in a received given query using the distribution map to identify which of the index servers contains reverse index information for each corresponding term of the given query; and forwarding the given query to the identified index servers to retrieve links to said content nodes to obtain a result for the given query.

* * * * *

UNITED STATES PATENT AND TRADEMARK OFFICE
CERTIFICATE OF CORRECTION

| | | |
|---|---|---|
| PATENT NO. | : 8,117,215 B2 | Page 1 of 1 |
| APPLICATION NO. | : 12/889740 | |
| DATED | : February 14, 2012 | |
| INVENTOR(S) | : George H. Forman et al. | |

It is certified that error appears in the above-identified patent and that said Letters Patent is hereby corrected as shown below:

In column 2, line 36, delete ""tokens,"" and insert -- "tokens," or --, therefor.

In column 6, line 4, delete "be" and insert -- may be --, therefor.

In column 6, line 53, delete "a" and insert -- are a --, therefor.

In column 7, line 4, delete "as" and insert -- such as --, therefor.

In column 8, line 28, delete "reverse" and insert -- of reverse --, therefor.

Signed and Sealed this
Sixth Day of November, 2012

David J. Kappos
*Director of the United States Patent and Trademark Office*